United States Patent

Matlack et al.

(10) Patent No.: US 9,448,566 B2
(45) Date of Patent: Sep. 20, 2016

(54) FLUID PRESSURE REGULATING SYSTEM

(71) Applicant: Hamilton Sundstrand Corporation, Windsor Locks, CT (US)

(72) Inventors: Floyd K. Matlack, North Granby, CT (US); Paul A. Carvalho, Hadley, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 623 days.

(21) Appl. No.: 13/932,431

(22) Filed: Jul. 1, 2013

(65) Prior Publication Data

US 2015/0000752 A1 Jan. 1, 2015

(51) Int. Cl.
*B64C 11/38* (2006.01)
*G05D 16/10* (2006.01)
*F15B 11/17* (2006.01)

(52) U.S. Cl.
CPC ............... *G05D 16/10* (2013.01); *F15B 11/17* (2013.01); *B64C 11/38* (2013.01); *F15B 2211/20592* (2013.01); *F15B 2211/50536* (2013.01); *F15B 2211/66* (2013.01); *Y10T 137/0379* (2015.04); *Y10T 137/7904* (2015.04); *Y10T 137/86019* (2015.04)

(58) Field of Classification Search
None
See application file for complete search history.

(56) References Cited

U.S. PATENT DOCUMENTS

| | | | |
|---|---|---|---|
| 2,756,771 A | 7/1956 | Spencer | |
| 4,590,958 A * | 5/1986 | Brunner | B60G 17/056 137/494 |
| 6,059,528 A * | 5/2000 | Danielson | B64C 11/303 416/153 |
| 2011/0253235 A1* | 10/2011 | Bohm | B64C 11/38 137/565.15 |

FOREIGN PATENT DOCUMENTS

| | | |
|---|---|---|
| EP | 2236879 A2 | 10/2010 |
| GB | 725181 | 3/1955 |
| GB | 1307767 | 2/1973 |

OTHER PUBLICATIONS

The European Search Report mailed May 13, 2015 for European Application No. 14174572.9.

\* cited by examiner

*Primary Examiner* — Ninh H Nguyen
*Assistant Examiner* — Justin Seabe
(74) *Attorney, Agent, or Firm* — Kinney & Lange, P.A.

(57) ABSTRACT

A fluid pressure regulating system includes an auxiliary fluid circuit having a high pressure region and a low pressure region, a pump connected to the auxiliary fluid circuit and configured to discharge fluid into the high pressure region of the auxiliary fluid circuit, and a check valve connecting the high pressure region of the auxiliary fluid circuit to a main fluid interface line. The fluid pressure regulating system also includes a pressure regulating valve connecting the high pressure region of the auxiliary fluid circuit and the low pressure region of the auxiliary fluid circuit. The pressure regulating valve includes an aperture defining a fluid path from the high pressure region of the auxiliary fluid circuit to the low pressure region of the auxiliary fluid circuit. The aperture has a variable area as a function of fluid pressure within the main fluid interface line.

14 Claims, 2 Drawing Sheets

FLUID PRESSURE REGULATING SYSTEM

BACKGROUND

The present disclosure relates to fluid pressure regulation, and in particular to a fluid pressure regulation system using a pressure regulating valve.

Certain aircraft systems rely, at least in part, on fluid pressure (e.g., oil pressure, hydraulic fluid pressure, and the like) provided by one or more fluid pumps. For instance, a propeller control module of an aircraft may use oil pressure to hydraulically actuate the pitch of an aircraft propeller. Many such systems include redundant sub-systems for safety and reliability. For instance, an oil pressure system that supplies pressurized oil to a propeller control module may include a main pump system including a main oil pump as well as an auxiliary pump system including an auxiliary oil pump. A system controller may activate the auxiliary pump system in response to, or in anticipation of, a failure within the main pump system (e.g., a failure of the main pump to actively discharge oil). However, when both the main pump and auxiliary pump actively discharge fluid into the system, such as when a failure is anticipated but does not occur, pressure may increase within the auxiliary pump system. The pressure increase may result in a rapid temperature increase within the auxiliary pump system that can be detrimental to components of the fluid pressure system.

SUMMARY

In one example, a fluid pressure regulating system includes an auxiliary fluid circuit having a high pressure region and a low pressure region, a pump connected to the auxiliary fluid circuit and configured to discharge fluid into the high pressure region of the auxiliary fluid circuit, and a check valve connecting the high pressure region of the auxiliary fluid circuit to a main fluid interface line. The fluid pressure regulating system also includes a pressure regulating valve connecting the high pressure region of the auxiliary fluid circuit and the low pressure region of the auxiliary fluid circuit. The pressure regulating valve includes an aperture defining a fluid path from the high pressure region of the auxiliary fluid circuit to the low pressure region of the auxiliary fluid circuit. The aperture has a variable area as a function of fluid pressure within the main fluid interface line.

In another example, a pressure regulating valve includes a first inlet port configured to connect to a high pressure region of an auxiliary fluid circuit, a second inlet port configured to connect to a main fluid interface line of a main fluid circuit, and an outlet port configured to connect to a low pressure region of the auxiliary fluid circuit. The pressure regulating valve also includes an aperture connecting the first inlet port and the outlet port and defining a fluid path from the high pressure region of the auxiliary fluid circuit to the low pressure region of the auxiliary fluid circuit. The pressure regulating valve also includes a valve spool assembly comprising a valve spool and a valve sleeve arranged to circumscribe the valve spool. The valve spool is configured to be slidably moveable within the valve sleeve to change an area of the aperture as a function of fluid pressure within the main fluid interface line.

In another example, a method of regulating fluid pressure within an auxiliary fluid circuit having a pressure regulating valve connecting a high pressure region of the auxiliary fluid circuit and a low pressure region of the auxiliary fluid circuit includes sliding a valve spool circumscribed by a valve sleeve of the pressure regulating valve within the valve sleeve as a function of fluid pressure within a main fluid interface line to change an area of an aperture. The aperture defines a fluid path from the high pressure region of the auxiliary fluid circuit to the low pressure region of the auxiliary fluid circuit.

DETAILED DESCRIPTION

A fluid pressure regulating system according to the present disclosure regulates fluid pressure within an auxiliary fluid circuit as a function of fluid pressure within a main fluid line. In this way, the fluid pressure regulating system can decrease a magnitude of a temperature increase in the auxiliary fluid circuit when both a main pump an auxiliary pump actively supply fluid pressure to the system.

As one example, the fluid pressure regulating system may be an oil pressure regulating system that supplies oil pressure to a propeller control module that controls (e.g., changes) the pitch of an aircraft propeller. A system controller may anticipate a failure within the main oil pressure system, such as during a negative-g maneuver of the aircraft (i.e., a maneuver of the aircraft such that a sum of the resulting forces acting upon the aircraft produce an acceleration vector having a component that is opposite the acceleration due to gravity). For instance, during a negative-g maneuver, an inlet of a main oil pump within the system may be deprived of oil, such as when the inlet is positioned at the bottom of an oil reservoir. However, such deprivation may occur during some negative-g maneuvers but not others. That is, during some negative-g maneuvers, the inlet of the main oil pump may be deprived of oil, thereby preventing the main oil pump from actively discharging pressurized oil into the system. However, during other negative-g maneuvers, the inlet of the main oil pump may not be deprived of oil, and the main oil pump may continue to actively discharge pressurized oil into the system. It may be difficult or impractical to ascertain which negative-g maneuvers may cause a deprivation of oil to the inlet of the main oil pump. Accordingly, a controller may activate an auxiliary oil pump in response to a detected negative-g maneuver to ensure that oil pressure is supplied to the consuming system (e.g., a propeller control module) during each negative-g maneuver.

A controller that activates an auxiliary pump in response to a detected negative-g maneuver may cause, in certain examples, both the main pump and the auxiliary pump to actively discharge oil into the system. Pressure, and resulting temperature, may rapidly increase within the auxiliary fluid system when both the main pump and auxiliary pump actively discharge oil. Such increases may be detrimental to components of the auxiliary fluid system.

Figure 1:
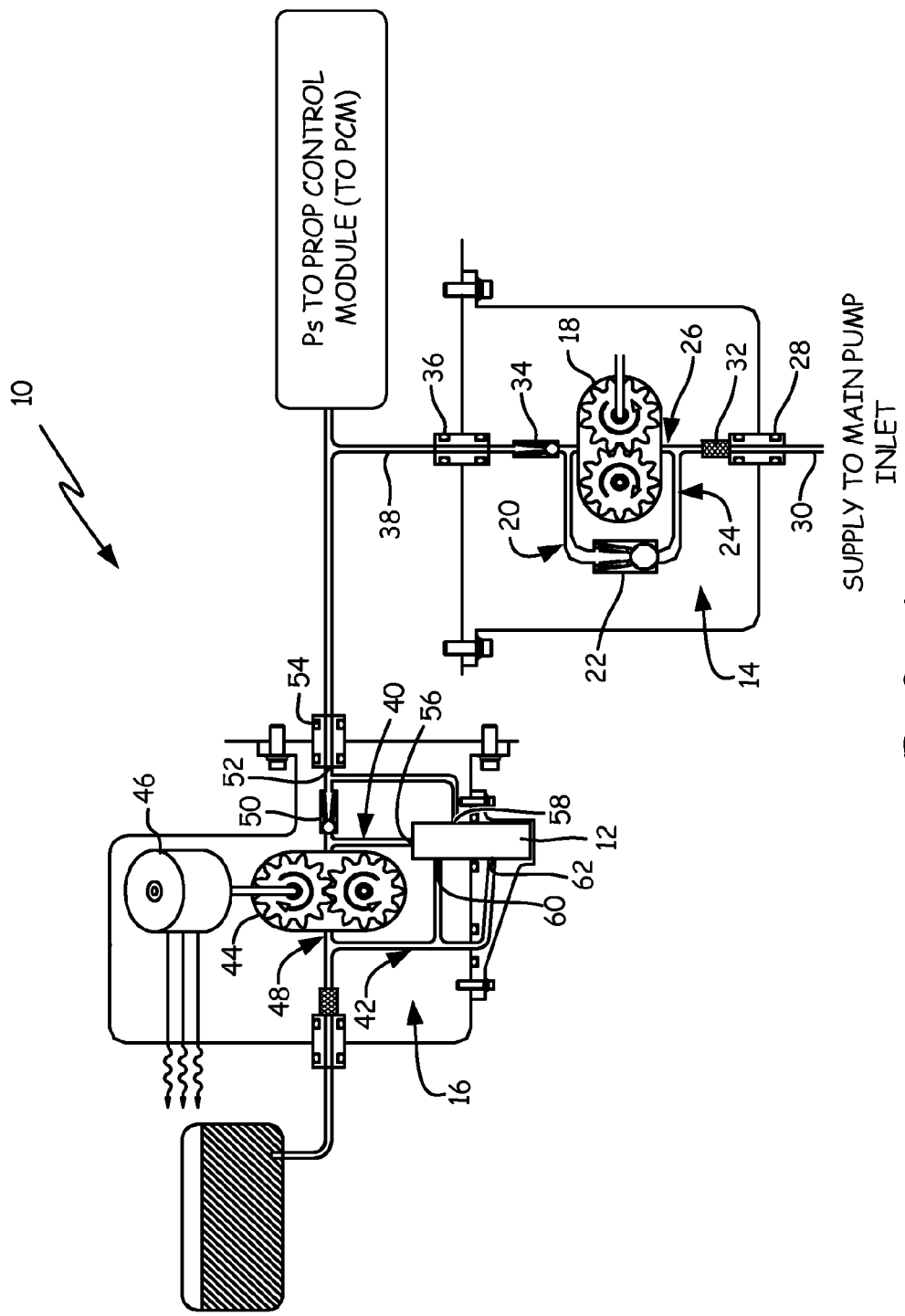
FIG. 1 is a schematic diagram of a fluid pressure regulating system including a pressure regulating valve.

FIG. 1 is a schematic diagram of fluid pressure regulating system 10 that utilizes pressure regulating valve 12 according to one or more aspects of this disclosure. Fluid pressure regulating system 10 includes main fluid circuit 14 and auxiliary fluid circuit 16. As illustrated, main fluid circuit 14 includes main pump 18, high pressure region 20, pressure regulating valve 22, and low pressure region 24. While main fluid circuit 14 is illustrated with respect to the example of FIG. 1 as including components 18, 20, 22, and 24, in some embodiments, main fluid circuit 14 may include more or fewer components than illustrated with respect to FIG. 1. For instance, in certain examples, main fluid circuit 14 may include one or more check valves, additional pressure regulating valves, additional motors, or other components.

Main pump 18 discharges fluid (e.g., oil) into high pressure region 20 of main fluid circuit 14. Examples of main pump 18 can include, but are not limited to, positive displacement pumps, such as fixed speed positive displacement pumps and/or variable speed positive displacement pumps. High pressure region 20 receives pressurized fluid discharged from main pump 18. Pressure regulating valve 22 connects high pressure region 22 and low pressure region 24. Pressure regulating valve 22 defines a fluid path from high pressure region 20 to low pressure region 24 through an aperture (not illustrated) of pressure regulating valve 22 configured to decrease fluid pressure between a main fluid circuit operating pressure (e.g., 1500 psi, 1550 psi, 1600 psi, or other fluid pressures) and a main fluid circuit return pressure (e.g., 10 psi, 15 psi, 20 psi, or other fluid pressures). Low pressure region 24 receives fluid from pressure regulating valve 22 at the main fluid circuit return pressure. Low pressure region 24 is connected to main pump inlet 26.

In operation, main pump 18 draws fluid from main pump inlet 26 (i.e., at the main fluid circuit return pressure) and discharges the fluid into high pressure region 20 at the main fluid circuit operating pressure. As illustrated, main pump inlet 26 can be connected to transfer tube 28 that is configured to connect to a fluid line, such as main fluid supply line 30. Main fluid supply line 30 can be connected to a main fluid reservoir (not illustrated) that provides a supply of fluid for operation of main fluid circuit 14. Accordingly, main pump 18, in operation, can draw fluid (e.g., oil) through main pump inlet 26 that receives fluid from both low pressure region 24 and main fluid supply line 30. In certain examples, such as in the illustrated example of FIG. 1, screen 32 can be disposed between transfer tube 28 and main pump inlet 26 to prevent debris or other particulate matter that may aggregate within a fluid reservoir from being drawn into main fluid circuit 14.

Check valve 34 connects high pressure region 20 and transfer tube 36, which is configured to connect to main fluid line 38. Check valve 34 may be a ball check valve, a diaphragm check valve, a swing check valve, or another type of check valve. In general, check valve 34 may be any type of valve that opens a fluid connection between high pressure region 20 and main fluid line 38 (e.g., through transfer tube 36) when fluid pressure within high pressure region 20 is greater than fluid pressure within main fluid line 38, and closes the fluid connection between high pressure region 20 and main fluid line 38 when fluid pressure within main fluid line 38 is greater than fluid pressure within high pressure region 20. In operation, check valve 34 opens a fluid connection between high pressure region 20 and main fluid line 38 when main pump 18 actively draws fluid from main pump inlet 26 and discharges the fluid into high pressure region 20 at the main pump operating pressure (e.g., 1550 psi). In this way, main pump 18 can operate to supply fluid at the main pump operating pressure through main fluid line 38 to a consuming system, such as a propeller control module that controls the pitch of an aircraft propeller.

As further illustrated in FIG. 1, fluid pressure regulating system 10 includes auxiliary fluid circuit 16. Auxiliary fluid circuit 16 includes high pressure region 40, low pressure region 42, auxiliary pump 44, and pressure regulating valve 12. In certain examples, auxiliary fluid circuit 16 may include more or fewer components, as was similarly described above with respect to main fluid circuit 14. Auxiliary pump 44 may be a positive displacement pump, such as a fixed speed and/or variable speed positive displacement pump in some embodiments. As illustrated, auxiliary pump 44 can be actuated by electric motor 46 that supplies mechanical power to auxiliary pump 44 to draw fluid (e.g., oil) from auxiliary pump inlet 48 and discharge the fluid into high pressure region 40 at an auxiliary pump operating pressure (e.g., 1400 psi, 1450 psi, 1500 psi, or other fluid pressures).

Check valve 50 connects high pressure region 40 of auxiliary fluid circuit 16 to main fluid interface line 52. Check valve 50 can be substantially similar to check valve 34 described above with respect to main fluid circuit 14, in that check valve 50 can be any type of valve that opens a fluid connection between high pressure region 40 and main fluid interface line 52 when fluid pressure within high pressure region 40 is greater than a fluid pressure within main fluid interface line 52 and closes the fluid connection between high pressure region 40 and main fluid interface line 52 when fluid pressure within main fluid interface line 52 is greater than fluid pressure within high pressure region 40. In some embodiments, check valve 50 can be a ball check valve.

Main fluid interface line 52 is connected to transfer tube 54, which is configured to connect to main fluid line 38. As illustrated, check valve 50 is disposed between main fluid interface line 52 and high pressure region 40. Accordingly, when main fluid interface line 52 is connected to main fluid line 38 (e.g., through transfer tube 54) and main pump 18 actively discharges fluid into main fluid line 38, main fluid interface line 52 receives fluid at the main fluid circuit operating pressure. In operation, as the main fluid circuit operating pressure may typically be greater than the auxiliary pump operating pressure, check valve 50 closes the fluid connection between high pressure region 40 of auxiliary fluid circuit 16 and main fluid interface line 52 when main pump 18 actively discharges fluid into main fluid line 38.

As illustrated, pressure regulating valve 12 includes auxiliary pump inlet port 56, main fluid system inlet port 58, auxiliary return outlet port 60, and auxiliary return pressure port 62. As is further described below with respect to FIG. 2, pressure regulating valve 12 includes an aperture (not illustrated in FIG. 1) that connects auxiliary pump inlet port 56 and auxiliary return outlet port 60 and defines a fluid path between high pressure region 40 and low pressure region 42. In operation, as auxiliary pump 44 discharges fluid into high pressure region 40 at the auxiliary pump operating pressure, fluid flows from high pressure region 40 through the aperture of pressure regulating valve 12 via auxiliary pump inlet port 56 and auxiliary return outlet port 60. Fluid enters auxiliary pump inlet port 56 at the auxiliary pump operating pressure (e.g., 1450 psi). As fluid passes through the aperture, pressure within the fluid decreases, thereby discharging through auxiliary return outlet port 60 into low pressure region 42 at an auxiliary return fluid pressure, such as 10 psi, 15 psi, 20 psi, or other fluid pressures that are less than the auxiliary pump operating pressure. In this way, pressure regulating valve 12 can be configured to regulate pressure within high pressure region 40 at an auxiliary pump operating pressure and regulate pressure within low pressure region 42 at an auxiliary return fluid pressure.

As fluid pressure decreases across the aperture of pressure regulating valve 12, energy dissipates in the form of heat. The dissipated heat can transfer to components of auxiliary fluid circuit 16, such as to pressure regulating valve 12. In certain examples, a rapid increase in pressure within high pressure region 40 can result in a rapid and high magnitude temperature increase within auxiliary fluid circuit 16 which can be detrimental to components of auxiliary fluid circuit 16. For instance, when main pump 18 actively discharges fluid into main fluid line 38, the resulting fluid pressure received by main fluid interface line 52 causes check valve 50 to close the fluid connection between high pressure region 40 and main fluid interface line 52. Accordingly, when auxiliary pump 44 actively discharges fluid into high pressure region 40 while main pump 18 actively discharges fluid into main fluid line 38, fluid pressure within high pressure region 40 can rapidly increase. The increased fluid pressure within high pressure region 40 can cause fluid to flow through the aperture of pressure regulating valve 12 at a greater rate, thereby resulting in a rapid increase in temperature.

According to techniques described herein, pressure regulating valve 12 is configured to vary the area of the aperture defining the fluid path from high pressure region 40 to low pressure region 42 as a function of fluid pressure within main fluid interface line 52. As illustrated, pressure regulating valve 12 includes main fluid system inlet port 58. Main fluid system inlet port 58 is connected to main fluid interface line 52. Because check valve 50 is disposed between high pressure region 40 and main fluid interface line 52, main fluid system inlet port 58 receives fluid through main fluid interface line 52 at the main fluid circuit operating pressure. Pressure regulating valve 12 is configured to increase an area of the aperture defining the fluid path between high pressure region 40 and low pressure region 42 in response to an increase in pressure of fluid received through main fluid system inlet port 58. By increasing the area of the aperture, pressure regulating valve 12 enables a greater rate of fluid flow through the aperture between high pressure region 40 and low pressure region 42, thereby decreasing the fluid pressure within high pressure region 40. As an example, pressure regulating valve 12 can increase the area of the aperture to decrease fluid pressure within high pressure region 40 from a first operating pressure of 1450 psi to a second operating pressure of 215 psi. The decrease in pressure within high pressure region 40 can result in a decreased pressure drop between high pressure region 40 and low pressure region 42, thereby reducing the magnitude of the corresponding temperature increase. Similarly, pressure regulating valve 12 is configured to decrease the area of the aperture in response to a decrease in pressure of fluid received through main fluid system inlet port 58 (e.g., indicating that main pump 18 is not actively discharging fluid into main fluid line 38), thereby increasing the pressure within high pressure region 40 and maintaining sufficient operating pressure to supply a consuming system, such as a propeller control module that controls the pitch of an aircraft propeller.

Figure 2:
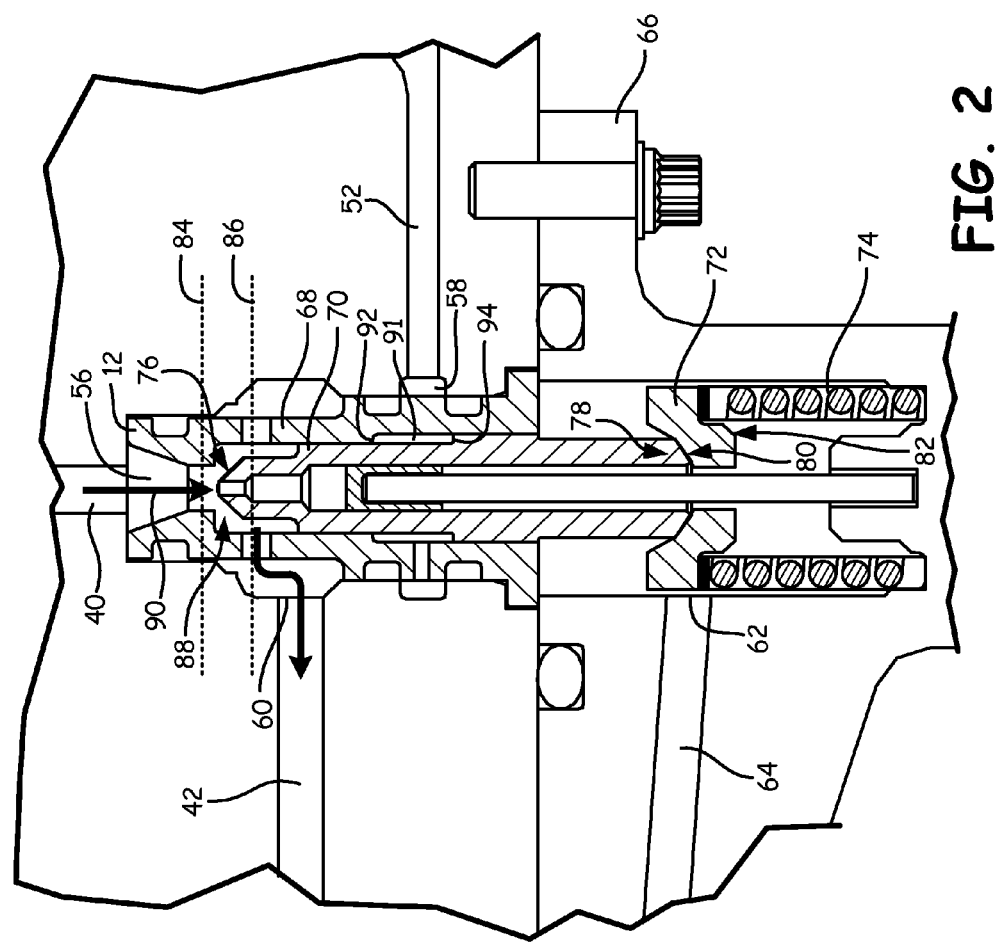
FIG. 2 is a cut-away view illustrating details of the interior of the pressure regulating valve of FIG. 1.

FIG. 2 is a cut-away view illustrating details of the interior of pressure regulating valve 12 of FIG. 1. As illustrated in FIG. 2, pressure regulating valve 12 includes auxiliary pump inlet port 56, main fluid system inlet port 58, auxiliary return outlet port 60, and auxiliary return pressure port 62. Auxiliary pump inlet port 56 is connected to high pressure region 40. Main fluid system inlet port 58 is connected to main fluid interface line 52. Auxiliary return outlet port 60 is connected to low pressure region 42. In addition, auxiliary return pressure port 62 is connected to low pressure region 42 via auxiliary return pressure line 64.

As illustrated in the example of FIG. 2, pressure regulating valve 12 further includes valve housing 66, valve sleeve 68, valve spool 70, valve seat 72, and valve spring 74. Valve sleeve 68 is fixedly secured to valve housing 66 and is configured to circumscribe valve spool 70. Valve spool 70 extends axially within valve sleeve 68 from first spool portion 76 proximate auxiliary pump inlet port 56 to second spool portion 78 that engages first valve seat surface 80 of valve seat 72. Second valve seat surface 82 of valve seat 72, opposite first valve seat surface 80, engages valve spring 74. Valve spool 70 is configured to be slidably moveable within valve sleeve 68. For instance, in the example of FIG. 2, valve spool 70 is configured to slide between at least first position 84 and second position 86. Valve spring 74 (e.g., a compression spring) is configured to apply force to valve seat 72 in a direction from second position 86 to first position 84.

Aperture 88 connects auxiliary pump inlet port 56 and auxiliary return outlet port 60 and defines a fluid path from high pressure region 40 to low pressure region 42. In operation, auxiliary pump inlet port 56 receives fluid from high pressure region 40 at the auxiliary pump operating pressure. Fluid flows through aperture 88 along fluid path 90 and discharges into low pressure region 42 through auxiliary return outlet port 60. As discussed above, as fluid passes through aperture 88, pressure within the fluid decreases and energy dissipates in the form of heat. The pressure differential between high pressure region 40 and low pressure region 42 is a function of the area of aperture 88. That is, as the area of aperture 88 increases, the pressure differential between high pressure region 40 and low pressure region 42 decreases. Accordingly, the magnitude of the temperature increase as fluid passes from high pressure region 40 to low pressure region 42 decreases as the area of aperture 88 increases.

As illustrated, the position of valve spool 70 within valve sleeve 68 defines the area of aperture 88. For instance, when valve spool 70 is positioned at first position 84, the area of aperture 88 is less than the area of aperture 88 when valve spool 70 is positioned at second position 86. As such, as valve spool 70 moves from first position 84 to second position 86, the area of aperture 88 increases and the resulting pressure differential between high pressure region 40 and low pressure region 42 decreases, thereby decreasing a resulting temperature increase as fluid flows through aperture 88. As valve spool 70 moves from second position 86 to first position 84, the area of aperture 88 decreases and the resulting pressure differential between high pressure region 40 and low pressure region 42 increases.

As illustrated, pressure regulating valve 12 includes annular gap 91 configured to be in fluid connection with main fluid interface line 52. Annular gap 91 is disposed between valve spool 70 and valve sleeve 68 and is configured to circumscribe valve spool 70. First annular gap portion 92 abuts valve sleeve 68. Second annular gap portion 94 abuts valve spool 70. First annular gap portion 92 is opposite second annular gap portion 94 along an axis that extends from first valve spool portion 76 to second spool portion 78.

In operation, fluid enters annular gap 91 through main fluid system inlet port 58 at the main fluid circuit operating pressure. As fluid pressure within annular gap 91 increases, a net force results in a direction from first annular gap portion 92 to second annular gap portion 94. When the net force exceeds the spring force exerted by spring 74, valve spool 70 slides within valve sleeve 68 in a direction from first position 84 to second position 86. Similarly, as fluid pressure within annular gap 91 decreases, the spring force exerted by spring 74 can exceed the net force resulting from the pressure within annular gap 91, thereby causing valve spool 70 to slide within valve sleeve 68 in a direction from second position 86 to first position 84. Accordingly, first position 84 corresponds to a minimum fluid pressure within annular gap 91 (and main fluid interface line 52), and second position 86 corresponds to a maximum fluid pressure within annular gap 91 (and main fluid interface line 52). Fluid is received through auxiliary return pressure port 62 via auxiliary return pressure line 64 that is connected to low pressure region 42, thereby preventing suction within the cavity of spring 74 and providing consistent spring compression force.

According to techniques described herein, fluid pressure regulating system 10 (e.g., an oil pressure regulating system) regulates fluid pressure within auxiliary fluid circuit 16 as a function of fluid pressure within main fluid line 38. Auxiliary fluid circuit 16 includes pressure regulating valve 12 that connects high pressure region 40 and low pressure region 42 of auxiliary fluid circuit 16. Pressure regulating valve 12 includes aperture 88 that defines fluid path 90 from high pressure region 40 to low pressure region 42. Pressure regulating valve 12 varies an area of aperture 88 as a function of fluid pressure within main fluid line 38. In this way, fluid pressure regulating system 10 can decrease a magnitude of a temperature increase in auxiliary fluid circuit 16 when both main pump 18 and auxiliary pump 44 actively discharge fluid into a main fluid line that supplies a consuming system, such as a propeller control module that controls the pitch of an aircraft propeller. Accordingly, techniques described herein may decrease negative impacts to system components resulting from rapid pressure and temperature increases within the system.

The following are non-exclusive descriptions of embodiments of the present disclosure.

A fluid pressure regulating system includes an auxiliary fluid circuit having a high pressure region and a low pressure region, a pump connected to the auxiliary fluid circuit and configured to discharge fluid into the high pressure region of the auxiliary fluid circuit, and a check valve connecting the high pressure region of the auxiliary fluid circuit to a main fluid interface line. The fluid pressure regulating system also includes a pressure regulating valve connecting the high pressure region of the auxiliary fluid circuit and the low pressure region of the auxiliary fluid circuit. The pressure regulating valve includes an aperture defining a fluid path from the high pressure region of the auxiliary fluid circuit to the low pressure region of the auxiliary fluid circuit. The aperture has a variable area as a function of fluid pressure within the main fluid interface line.

The fluid pressure regulating system of the preceding paragraph can optionally include, additionally and/or alternatively, any one or more of the following features, configurations, and/or additional components:

The pressure regulating valve may further include a first inlet port connected to the high pressure region of the auxiliary fluid circuit, a second inlet port connected to the main fluid interface line, an outlet port connected to the low pressure region of the auxiliary fluid circuit, and a valve spool assembly comprising a valve spool and a valve sleeve arranged to circumscribe the valve spool. The valve spool may be configured to be slidably moveable within the valve sleeve between a first position corresponding to a minimum pressure within the main fluid interface line and a second position corresponding to a maximum pressure within the main fluid interface line.

The first position of the valve spool corresponding to the minimum pressure within the main fluid interface line may define a minimum area of the aperture of the pressure regulating valve. The second position of the valve spool corresponding to the maximum pressure within the main fluid interface line may define a maximum area of the aperture of the pressure regulating valve.

The valve spool assembly may further include an annular gap disposed between the valve spool and the valve sleeve. The annular gap may be configured to be in fluid connection with the second inlet port connected to the main fluid interface line. The valve spool may be configured to slide in a first direction from the first position corresponding to the minimum pressure within the main fluid interface line to the second position corresponding to the maximum pressure within the main fluid interface line responsive to an increase in pressure of fluid within the annular gap. The valve spool may be configured to slide in a second direction from the second position corresponding to the maximum pressure within the main fluid interface line to the first position corresponding to the minimum pressure within the main fluid interface line responsive to a decrease in pressure of fluid within the annular gap.

The check valve may be configured to open a fluid connection from the high pressure region of the auxiliary fluid circuit to the main fluid interface line when fluid pressure within the high pressure region of the auxiliary fluid circuit is greater than fluid pressure within the main fluid interface line and to close the fluid connection when fluid pressure within the high pressure region of the auxiliary fluid circuit is less than fluid pressure within the main fluid interface line.

The main fluid interface line may be connected to a propeller control module that controls the pitch of an aircraft propeller.

The fluid pressure regulating system may further include a main pump connected to a main fluid circuit. The main fluid circuit may include the main fluid interface line.

The pump connected to the auxiliary fluid circuit may include a fixed speed positive displacement pump.

The fluid pressure regulating system may include an oil pressure regulating system.

A pressure regulating valve includes a first inlet port configured to connect to a high pressure region of an auxiliary fluid circuit, a second inlet port configured to connect to a main fluid interface line of a main fluid circuit, and an outlet port configured to connect to a low pressure region of the auxiliary fluid circuit. The pressure regulating valve also includes an aperture connecting the first inlet port and the outlet port and defining a fluid path from the high pressure region of the auxiliary fluid circuit to the low pressure region of the auxiliary fluid circuit. The pressure regulating valve also includes a valve spool assembly comprising a valve spool and a valve sleeve arranged to circumscribe the valve spool. The valve spool is configured to be slidably moveable within the valve sleeve to change an area of the aperture as a function of fluid pressure within the main fluid interface line.

The pressure regulating valve of the preceding paragraph can optionally include, additionally and/or alternatively, any one or more of the following features, configurations, and/or additional components:

The valve spool may be configured to be slidably moveable within the valve sleeve between a first position corresponding to a minimum pressure within the main fluid interface line and a second position corresponding to a maximum pressure within the main fluid interface line.

The first position of the valve spool corresponding to the minimum pressure within the main fluid interface line may define a minimum area of the aperture of the pressure regulating valve. The second position of the valve spool corresponding to the maximum pressure within the main fluid interface line may define a maximum area of the aperture of the pressure regulating valve.

The valve spool assembly may further include an annular gap disposed between the valve spool and the valve sleeve. The annular gap may be configured to be in fluid connection with the second inlet port connected to the main fluid interface line. The valve spool may be configured to slide in a first direction from the first position corresponding to the minimum pressure within the main fluid interface line to the second position corresponding to the maximum pressure within the main fluid interface line responsive to an increase in pressure of fluid within the annular gap. The valve spool may be configured to slide in a second direction from the second position corresponding to the maximum pressure within the main fluid interface line to the first position corresponding to the minimum pressure within the main fluid interface line responsive to a decrease in pressure of fluid within the annular gap.

The pressure regulating valve may include an oil pressure regulating valve.

A method of regulating fluid pressure within an auxiliary fluid circuit having a pressure regulating valve connecting a high pressure region of the auxiliary fluid circuit and a low pressure region of the auxiliary fluid circuit, the pressure regulating valve having an aperture defining a fluid path from the high pressure region of the auxiliary fluid circuit to the low pressure region of the auxiliary fluid circuit, includes sliding a valve spool circumscribed by a valve sleeve of the pressure regulating valve within the valve sleeve as a function of fluid pressure within a main fluid interface line to change an area of the aperture.

The method of the preceding paragraph can optionally include, additionally and/or alternatively, any one or more of the following features, configurations, and/or additional components:

Sliding the valve spool within the valve sleeve as a function of fluid pressure within the main fluid line further may include sliding the valve spool within the valve sleeve between a first position corresponding to a minimum pressure within the main fluid interface line and a second position corresponding to a maximum pressure within the main fluid interface line.

The first position of the valve spool corresponding to the minimum pressure within the main fluid interface line may define a minimum area of the aperture of the pressure regulating valve. The second position of the valve spool corresponding to the maximum pressure within the main fluid interface line may define a maximum area of the aperture of the pressure regulating valve.

The method may further include receiving fluid within an annular gap disposed between the valve spool and the valve sleeve and in fluid connection with the main fluid interface line, and in response to an increase in fluid pressure of the fluid within the annular gap, sliding the valve spool in a direction from the first position corresponding to the minimum pressure within the main fluid interface line to the second position corresponding to the maximum pressure within the main fluid line.

The method may further include receiving fluid within an annular gap arranged between the valve spool and the valve sleeve and in fluid connection with the main fluid interface line, and in response to a decrease in fluid pressure of the fluid within the annular gap, sliding the valve spool in a direction from the second position corresponding to the maximum pressure within the main fluid interface line to the first position corresponding to the minimum pressure within the main fluid interface line.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fluid pressure regulating system comprising:
   an auxiliary fluid circuit having a high pressure region and a low pressure region;
   a pump connected to the auxiliary fluid circuit and configured to discharge fluid into the high pressure region of the auxiliary fluid circuit;
   a check valve connecting the high pressure region of the auxiliary fluid circuit to a main fluid interface line; and
   a pressure regulating valve connecting the high pressure region of the auxiliary fluid circuit and the low pressure region of the auxiliary fluid circuit, the pressure regulating valve having an aperture defining a fluid path from the high pressure region of the auxiliary fluid circuit to the low pressure region of the auxiliary fluid circuit, the aperture having a variable area as a function of fluid pressure within the main fluid interface line,
   wherein the pressure regulating valve further comprises:
      a first inlet port connected to the high pressure region of the auxiliary fluid circuit;
      a second inlet port connected to the main fluid interface line;
      an outlet port connected to the low pressure region of the auxiliary fluid circuit; and
      a valve spool assembly comprising a valve spool and a valve sleeve arranged to circumscribe the valve spool, wherein the valve spool is configured to be slidably moveable within the valve sleeve between a first position corresponding to a minimum pressure within the main fluid interface line and a second position corresponding to a maximum pressure within the main fluid interface line,
      wherein the valve spool assembly further comprises an annular gap disposed between the valve spool and the valve sleeve,
      wherein the annular gap is configured to be in fluid connection with the second inlet port connected to the main fluid interface line,
      wherein the valve spool is configured to slide in a first direction from the first position corresponding to the minimum pressure within the main fluid interface line to the second position corresponding to the maximum pressure within the main fluid interface line responsive to an increase in pressure of fluid within the annular gap, and
      wherein the valve spool is configured to slide in a second direction from the second position corresponding to the maximum pressure within the main fluid interface line to the first position corresponding to the minimum pressure within the main fluid interface line responsive to a decrease in pressure of fluid within the annular gap.

2. The fluid pressure regulating system of claim 1, wherein the position of the valve spool within the valve sleeve defines the area of the aperture of the pressure regulating valve.

3. The fluid pressure regulating system of claim 1,
wherein the first position of the valve spool corresponding to the minimum pressure within the main fluid interface line defines a minimum area of the aperture of the pressure regulating valve, and
wherein the second position of the valve spool corresponding to the maximum pressure within the main fluid interface line defines a maximum area of the aperture of the pressure regulating valve.

4. The fluid pressure regulating system of claim 1, wherein the check valve is configured to open a fluid connection from the high pressure region of the auxiliary fluid circuit to the main fluid interface line when fluid pressure within the high pressure region of the auxiliary fluid circuit is greater than fluid pressure within the main fluid interface line and to close the fluid connection when fluid pressure within the high pressure region of the auxiliary fluid circuit is less than fluid pressure within the main fluid interface line.

5. The fluid pressure regulating system of claim 1, wherein the main fluid interface line is connected to a propeller control module that controls the pitch of an aircraft propeller.

6. The fluid pressure regulating system of claim 1, further comprising a main pump connected to a main fluid circuit, wherein the main fluid circuit comprises the main fluid interface line.

7. The fluid pressure regulating system of claim 1, wherein the pump connected to the auxiliary fluid circuit comprises a fixed speed positive displacement pump.

8. The fluid pressure regulating system of claim 1, wherein the fluid pressure regulating system comprises an oil pressure regulating system.

9. A pressure regulating valve comprising:
a first inlet port configured to connect to a high pressure region of an auxiliary fluid circuit;
a second inlet port configured to connect to a main fluid interface line of a main fluid circuit;
an outlet port configured to connect to a low pressure region of the auxiliary fluid circuit;
an aperture connecting the first inlet port and the outlet port and defining a fluid path from the high pressure region of the auxiliary fluid circuit to the low pressure region of the auxiliary fluid circuit; and
a valve spool assembly comprising a valve spool and a valve sleeve arranged to circumscribe the valve spool, wherein the valve spool is configured to be slidably moveable within the valve sleeve to change an area of the aperture as a function of fluid pressure within the main fluid interface line,
wherein the valve spool is configured to be slidably moveable within the valve sleeve between a first position corresponding to a minimum pressure within the main fluid interface line and a second position corresponding to a maximum pressure within the main fluid interface line,
wherein the valve spool assembly further comprises an annular gap disposed between the valve spool and the valve sleeve,
wherein the annular gap is configured to be in fluid connection with the second inlet port connected to the main fluid interface line,
wherein the valve spool is configured to slide in a first direction from the first position corresponding to the minimum pressure within the main fluid interface line to the second position corresponding to the maximum pressure within the main fluid interface line responsive to an increase in pressure of fluid within the annular gap, and
wherein the valve spool is configured to slide in a second direction from the second position corresponding to the maximum pressure within the main fluid interface line to the first position corresponding to the minimum pressure within the main fluid interface line responsive to a decrease in pressure of fluid within the annular gap.

10. The pressure regulating valve of claim 9,
wherein the first position of the valve spool corresponding to the minimum pressure within the main fluid interface line defines a minimum area of the aperture of the pressure regulating valve, and
wherein the second position of the valve spool corresponding to the maximum pressure within the main fluid interface line defines a maximum area of the aperture of the pressure regulating valve.

11. The pressure regulating valve of claim 9, wherein the pressure regulating valve comprises an oil pressure regulating valve.

12. A method of regulating fluid pressure within an auxiliary fluid circuit having a pressure regulating valve connecting a high pressure region of the auxiliary fluid circuit and a low pressure region of the auxiliary fluid circuit, the pressure regulating valve having an aperture defining a fluid path from the high pressure region of the auxiliary fluid circuit to the low pressure region of the auxiliary fluid circuit, the method comprising:
sliding a valve spool circumscribed by a valve sleeve of the pressure regulating valve within the valve sleeve as a function of fluid pressure within a main fluid interface line to change an area of the aperture, wherein sliding the valve spool within the valve sleeve as a function of fluid pressure within the main fluid line further comprises sliding the valve spool within the valve sleeve between a first position corresponding to a minimum pressure within the main fluid interface line and a second position corresponding to a maximum pressure within the main fluid interface line;
receiving fluid within an annular gap disposed between the valve spool and the valve sleeve and in fluid connection with the main fluid interface line; and
in response to an increase in fluid pressure of the fluid within the annular gap, sliding the valve spool in a direction from the first position corresponding to the minimum pressure within the main fluid interface line to the second position corresponding to the maximum pressure within the main fluid line.

13. The method of claim 12, wherein the first position of the valve spool corresponding to the minimum pressure within the main fluid interface line defines a minimum area of the aperture of the pressure regulating valve, and
wherein the second position of the valve spool corresponding to the maximum pressure within the main fluid interface line defines a maximum area of the aperture of the pressure regulating valve.

14. The method of claim 12,
wherein in response to a decrease in fluid pressure of the fluid within the annular gap, sliding the valve spool in a direction from the second position corresponding to the maximum pressure within the main fluid interface line to the first position corresponding to the minimum pressure within the main fluid interface line.

* * * * *